(12) United States Patent
Torigoe et al.

(10) Patent No.: US 7,547,987 B2
(45) Date of Patent: Jun. 16, 2009

(54) EMI REDUCED POWER INVERTER

(75) Inventors: Makato Torigoe, West Bloomfield, MI (US); Liang Shao, Ann Arbor, MI (US); George Saikalis, West Bloomfield, MI (US); Hiroki Funato, Yokohama (JP); Takayoshi Nakamura, Ibaraki (JP)

(73) Assignee: Hitachi, Ltd, Tokyo (JP)

( * ) Notice: Subject to any disclaimer, the term of this patent is extended or adjusted under 35 U.S.C. 154(b) by 99 days.

(21) Appl. No.: 11/425,751

(22) Filed: Jun. 22, 2006

(65) Prior Publication Data

US 2007/0296271 A1 Dec. 27, 2007

(51) Int. Cl.
*B60L 1/00* (2006.01)
*B60L 3/00* (2006.01)
*H02G 3/00* (2006.01)

(52) U.S. Cl. .................................... 307/10.1
(58) Field of Classification Search ............... 307/10.1, 307/43, 73, 87
See application file for complete search history.

(56) References Cited

U.S. PATENT DOCUMENTS

| | | | |
|---|---|---|---|
| 4,512,709 A | 4/1985 | Hennekes et al. | |
| 4,636,135 A | 1/1987 | Bancon | |
| 5,460,317 A | 10/1995 | Thomas et al. | |
| 5,594,632 A | 1/1997 | Barrett | |
| 5,684,678 A | 11/1997 | Barrett | |
| 5,761,051 A * | 6/1998 | Tran | 361/794 |
| 5,779,609 A | 7/1998 | Cullen et al. | |
| 5,841,202 A * | 11/1998 | Noguchi et al. | 307/10.1 |
| 5,879,277 A | 3/1999 | Dettman et al. | |
| 6,219,245 B1 | 4/2001 | Nagashima et al. | |
| 6,369,319 B1 | 4/2002 | Nagashima et al. | |
| 6,491,612 B1 | 12/2002 | Kurup et al. | |
| 6,661,311 B2 * | 12/2003 | Delvart | 333/181 |
| 2004/0167001 A1 | 8/2004 | Hagihara et al. | |
| 2005/0270806 A1 | 12/2005 | Zhu | |
| 2006/0021208 A1 | 2/2006 | Pfau et al. | |

FOREIGN PATENT DOCUMENTS

JP 04199787 * 7/1992

* cited by examiner

*Primary Examiner*—Albert W Paladini
*Assistant Examiner*—Carlos Amaya
(74) *Attorney, Agent, or Firm*—Gifford, Krass, Sprinkle, Anderson & Citkowski, P.C.

(57) ABSTRACT

A power inverter of the type used with hybrid electric vehicles having a circuit board with a power layer having a first and second section which are electrically separated using slits from each other on the power layer. A control circuit is connected to and powered by the first section of the power layer while a switching power supply is connected to and powered by the second section of the power layer. An electromagnetic filter is electrically connected between the sections of the power layer. This electromagnetic filter blocks high frequency noises of the type generated by the switching power supply while enabling the sections to be maintained at the same DC voltage level. Optionally, a ferrite covering is provided around a current bus bar of the power inverter to contain magnetic fields generated by current flow through the bus bar.

13 Claims, 3 Drawing Sheets

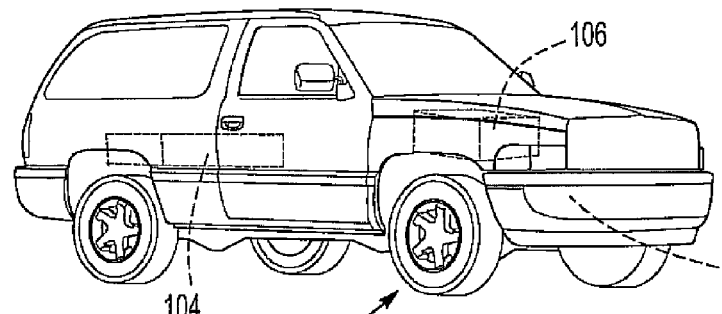
_Fig-3_
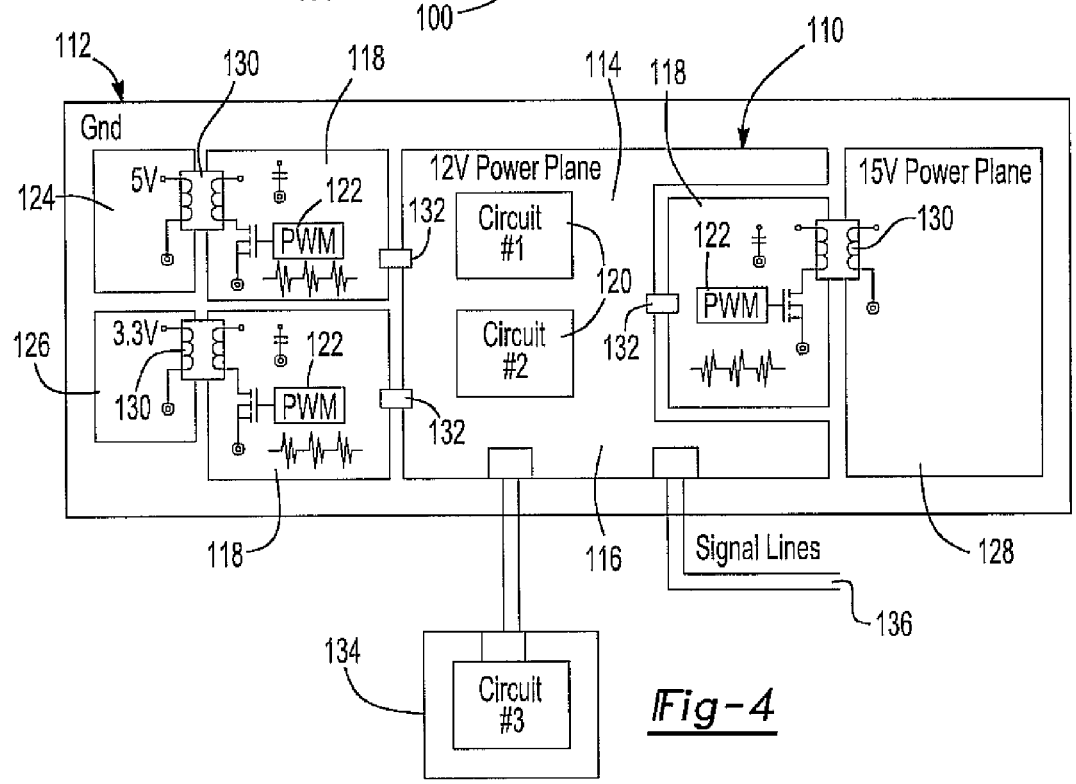
_Fig-4_
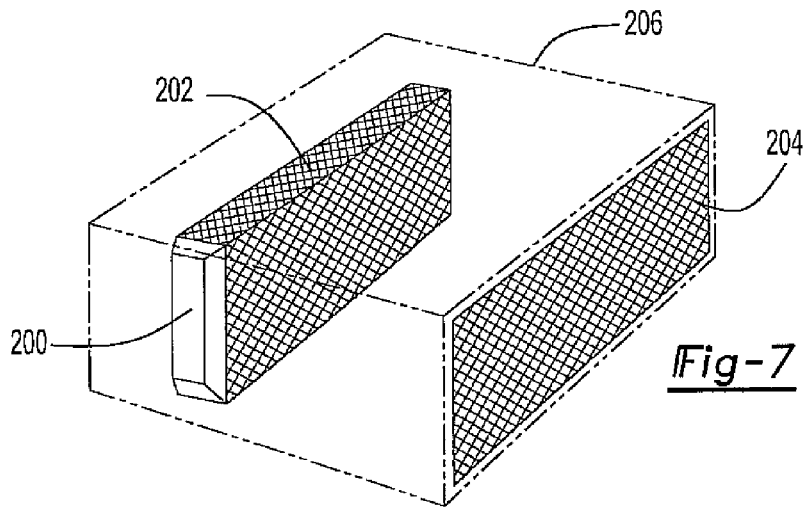
_Fig-7_

EMI REDUCED POWER INVERTER

BACKGROUND OF THE INVENTION

I. Field of the Invention

The present invention relates generally to power inverters and, more particularly, to a power inverter having a switching power supply.

II. Description of Related Art

In a hybrid electric vehicle (HEV) an electric motor is utilized to assist the engine to provide more traction and also to regenerate power to charge the battery. For both driving and regenerating, a power inverter is utilized to complete the conversion between AC and DC.

The power inverter constitutes the main electronic module in an HEV system. In such a system, a 12-volt source is the major power source voltage level for most of the automotive controller electronics. However, it is necessary to convert the 12-volt power source to other voltage levels in order to accommodate the other components of the HEV system. For example, typically, a 3.3-volt source is required for microcontrollers used in the HEV system while a 5-volt source is required for data acquisition. Furthermore, some pre-drivers require even different voltages, such as 15 volts for position sensing like resolver circuit.

In order to obtain the different voltage sources required for the HEV system, it has been the previous practice to utilize switching power supplies to convert the main 12-volt source to the other required voltage sources. Furthermore, power inverters for HEV systems typically are constructed on a multi-layer printed circuit board.

With reference then to FIG. 1, a typical prior art printed circuit board is diagrammatically illustrated. The circuit board 20 includes a 12-volt or main power layer or plane 22 on which one or more control circuits 24, illustrated only diagrammatically, are mounted and powered by the 12-volt power plane 22. The same power layer for the printed circuit board 20 also includes a 5-volt power plane 28, a 3-volt power plane 30, and a 15-volt power plane 32. The power planes 22, 28, 30 and 32 are physically separated from each other on the power layer for the printed circuit board 20 by removal of conductive material in the areas 36.

A first switching power supply 40 then converts the 12-volt source in the power plane 22 to 5 volts for the 5-volt power plane 28 utilizing a standard transformer 42. Similarly, a switching power supply 44 and transformer 46 converts the 12-volt power plane 22 to 3.3 volts for the power plane 30 and, similarly, a third switching power supply 48 and transformer 50 up converts the 12 volts in the 12-volt power plane 22 to 15 volts for the power plane 32.

One disadvantage of the previously known power inverters for HEV systems, however, is that the switching power supplies 40, 44 and 48 generate high amounts of electromagnetic interference (EMI) noise. Such EMI may adversely affect the operation not only of the control circuits 24, but also external circuits 52 which are electrically connected to the power inverter, as well as signal lines 54 also connected to the power inverter through conduction and affect vehicle radio through radiation too. Such EMI can not only cause malfunction of the circuitry for the HEV system, but may also result in incorrect data acquisition, radio static and even possibly compromised vehicle efficiency.

With reference now to FIG. 2, one previously known method of reducing the EMI transmitted from the switching power supplies 40, 44 and 48 to the control circuits 24, external circuits 52 and signal lines 54 has been to provide a bottleneck between the main power plane 22 and the various switching power supplies 40, 44 and 48. Such a bottleneck is formed by removing additional portions of the main power layer 22 so that only relatively small openings 56, 58 and 60 are provided between the main 12-volt power layer 22 and the power supplies 40, 44 and 48. In each case, however, a relatively small portion 62 of the main power layer 22 remains intact to maintain the voltage on the portion of the main power plane 22 on which the control circuits 24 are mounted and the other portions of the main power layer 22 on which the switching power supplies are mounted at the same DC voltage.

While the bottlenecks 62 are effective in reducing the transmission of EMI from the power switching supplies 40, 44 and 48, some EMI necessarily passes through each bottleneck 62 and can adversely affect the control circuits 24 as well as the external circuits 52 and signal lines 54.

SUMMARY OF THE PRESENT INVENTION

In brief, the present invention provides a power inverter particularly suitable for use in an HEV system which overcomes all of the above-mentioned disadvantages of the previously known power inverters.

In brief, the power inverter of the present invention comprises a printed circuit board having at least one power layer with at least a first and a second conductive section. These sections are electrically separated from each other on the power layer by providing gaps in the conductive power layer between the first and second sections which both electrically and physically isolate the sections from each other in the power layer.

A circuit component is connected to and powered by the first section of the power layer. Similarly, a switching power supply, e.g. a PWM switching power supply, is connected to and powered by the second section of the power layer.

In order to reduce the voltage fluctuation in the first and second sections of the power layer while minimizing the transmission of EMI from the switching power supply section to the shared 12V power section, an electromagnetic interference (EMI) filter and is used to electrically connect the different sections of the power layer together. This EMI filter, furthermore, is configured to attenuate or block at least a portion of the high frequency signals from the switching power supply sections to the shared 12V power section of the power layer. Although the EMI filter may take any conventional configuration, it preferably includes at least one inductor electrically connected between the sections of the power layer.

In a modification of the invention, the printed circuit board also includes a ground plane. In order to prevent the transmission of EMI along the ground plane from the switching power supplies to the control circuits on the main power board, the ground plane is also separated into at least two sections which are electrically and physically separated from each other on the printed circuit board by gaps in the appropriate conductive material between the different sections on the ground plane. The first section forms the ground for the circuit component sharing the common 12V power source in the power inverter while, similarly, the second section forms the ground for the switching power supply. These sections of the ground planes are then electrically connected to each other by an EMI filter configured to block at least a portion of the high frequency signals between the sections of the ground plane while enabling the ground plane to maintain the same DC voltage level. The EMI filter thus effectively prevents, or at least attenuates, the transmission of EMI between the ground planes of the circuit component and the switching power supplies.

Additionally, magnetic shielding, such as a ferrite coating, is optionally provided around the power bus bar to further reduce EMI.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 3 is a diagrammatic view of an HEV vehicle with a power inverter;

FIG. 4 is a view of the power level of a PC board for a power inverter in accordance with the present invention;

FIG. 7 is an elevational view showing another aspect of the invention.

DETAILED DESCRIPTION OF PREFERRED EMBODIMENTS OF THE PRESENT INVENTION

Figure 1:
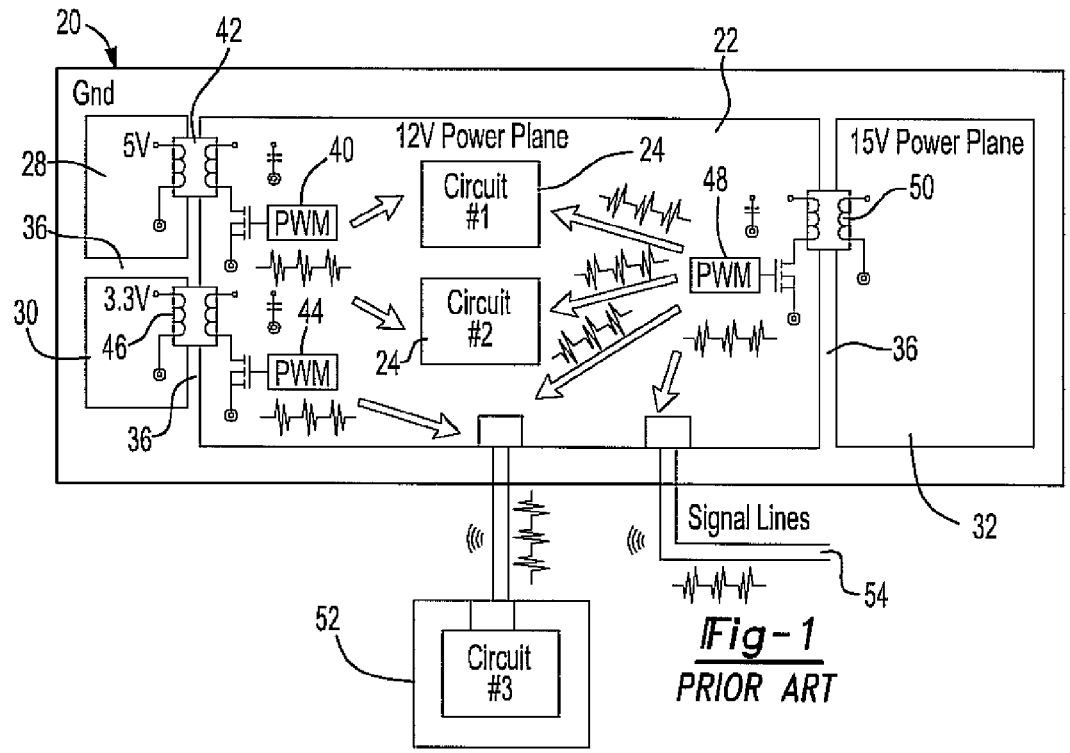
FIG. 1 is a prior art view of a printed circuit board for a power inverter.
Figure 2:
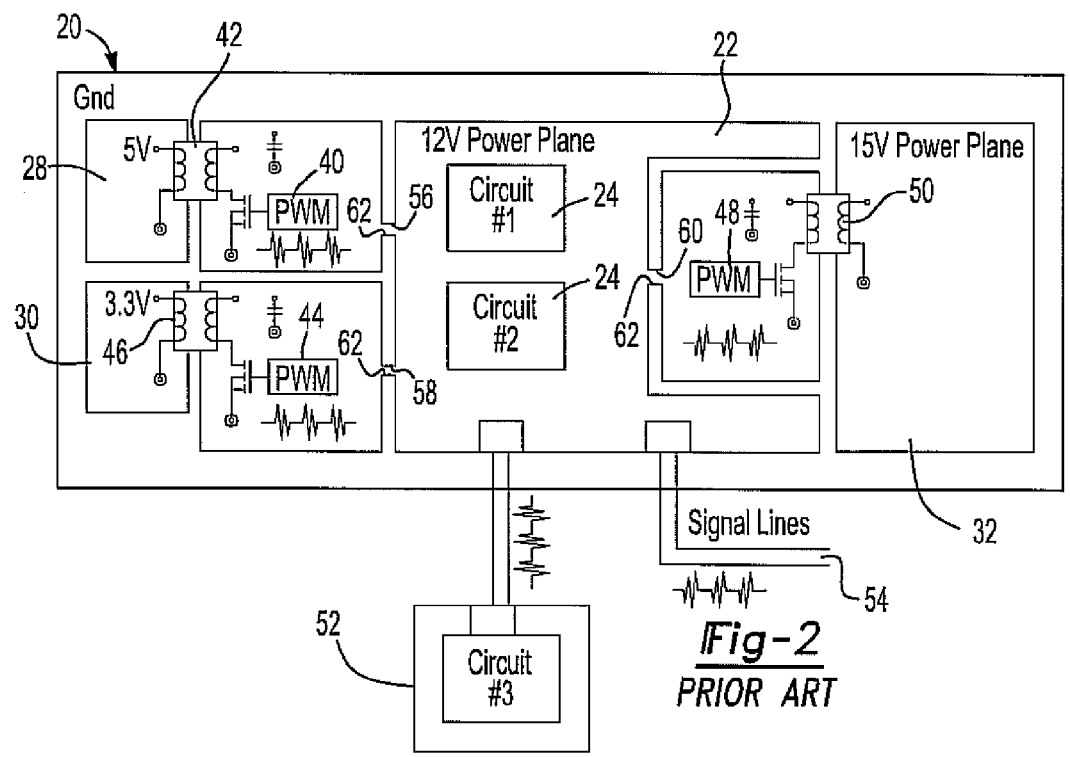
FIG. 2 is a prior art view similar to FIG. 1, but illustrating a modification thereof.

With reference first to FIG. 3, a hybrid electric vehicle (HEV) 100 is illustrated. The HEV includes not only a conventional internal combustion engine 102, but also an electric motor 104 which are selectively drivingly connected to the wheels of the vehicle 100 to propel it.

A power inverter 106 is mounted to the vehicle 100. Inside the power inverter module, there are many switching power supply functioning as DC-DC converter to provide the various electric voltages, typically 3.3 volts, 15 volts, 5 volts and 12 volts, used by the power inverter controller module in the HEV 100 during its operation.

With reference now to FIG. 4, a power plane 110 of a printed circuit board 112 contained within the controller module of the power inverter 106 (FIG. 3) is shown. The power plane 110 includes a main power plane or layer 114 which is typically maintained at 12 volts.

Unlike the previously known power inverters, the main power layer 114 is divided into a first section 116 as well as one or more second sections 118. The first section 116 is entirely electrically isolated and separated from each second section 118 on the power layer 110 by gaps in the conductive material between the first section 114 and the second sections 118. These gaps may be formed by the removal of conductive material in the power plane 114 or the omission of conductive material in the gaps when forming the power plane 114.

One or more circuit components 120, illustrated only diagrammatically, are mounted to and powered by the first section 114 of the power plane 110. Conversely, a switching power supply 122 is mounted in and electrically powered by each second section 118 of the power layer 110.

In the conventional fashion, each switching power supply 122 is used to convert the voltage in the main power layer 110 to different voltages as required by the HEV system. For example, one switching power supply 122 may be used to convert the 12-volt main power supply to a 5-volt power plane 124. Similarly, a second switching power supply 122 may convert the 12 volts in the main power layer 110 to a 3.3-volt power plane 126 while the third switching power supply 122 up converts the voltage in the main power layer 110 to a 15-volt power plane 128. Such switching power supplies create high frequency EMI noise in operation. Conventional transformers 130 are electrically connected to the power switching supplies to accomplish the desired up conversion or down conversion of the voltage from the main power layer 110.

In order to reduce the transmission of high frequency EMI noise from the second section 118 to the first section 114 which is caused by the switching power supplies 122, but still keep both of them the same DC potential, at least one electromagnetic interference (EMI) filter 132 is mounted on the printed circuit board 112 and electrically connected between the first section 114 of the power layer 110 and each second section 118 of the power layer 110. Furthermore, each electromagnetic interference filter is configured to attenuate or block at least a portion of high frequency signals of the type generated by the switching power supply 122 while enabling the sections to be maintained at the same DC voltage level. Consequently, the EMI filters 132 effectively shelter the circuit components 120 from EMI caused by the power switching supplies 122 as well as external circuits 134 and signal lines 136 connected to the printed circuit board 122. As used herein, "circuit components" shall include the circuit components 120 as well as the external circuits 134 and signal lines 136.

Figure 5:
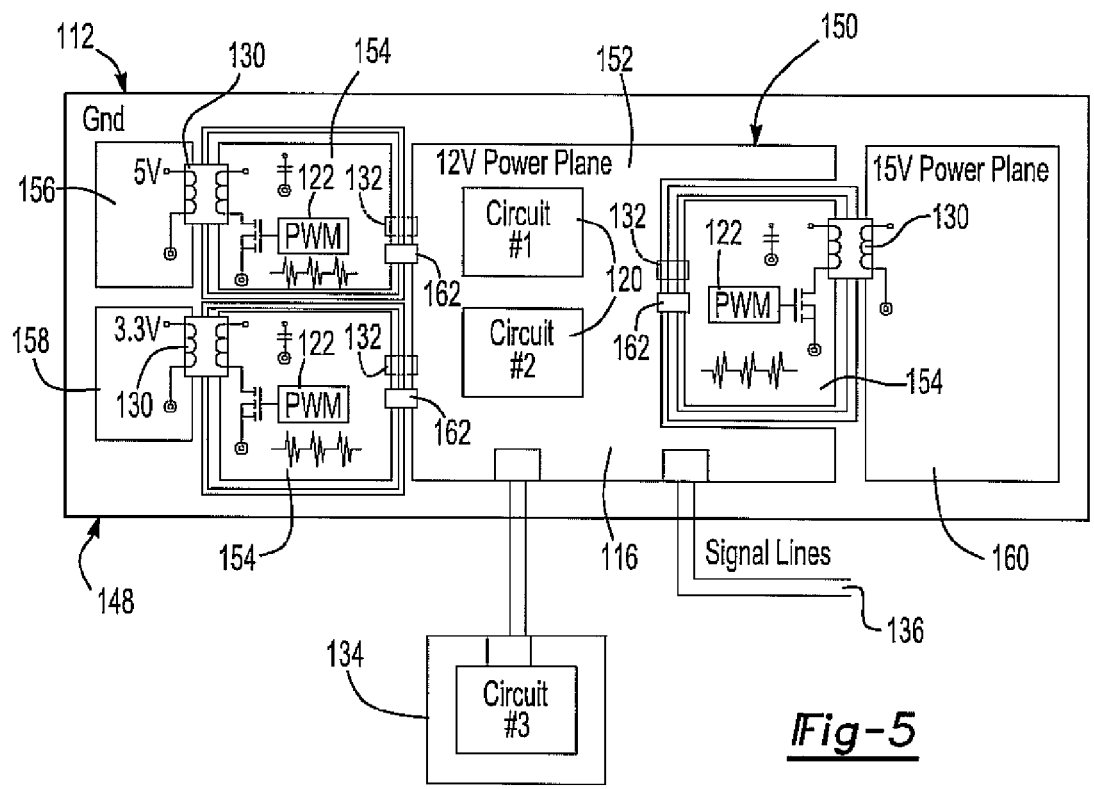
FIG. 5 is a view similar to FIG. 4 but illustrating a modification thereof.

Although the EMI filters 132 effectively attenuate the transmission of EMI between the first section 114 and second section 118 of the power layer 110, transmission of EMI can also occur on the ground or return plane between the power switching supplies 122 and the circuit components 120. Consequently, and with reference to FIG. 5, a ground plane 150 of the printed circuit board 112 is shown in which the ground plane for the main 12-volt power plane is divided into a first section 152 and at least one second section 154. The sections 152 and 154 of the ground plane 150 are electrically isolated and separated from each other on the ground plane 150 by gaps in the appropriate conductive material from the ground layer 148. Appropriate conductive material is also removed from the ground layer 148 to provide a ground plane 156 for the 5-volt source, a ground plane 158 for the 3.3-volt components, as well as a ground plane 160 for the 15-volt components.

The circuit components 122 are electrically connected to the first section 152 of the main 12-volt ground plane. Conversely, each switching power supply 122 is electrically connected to one of the second sections 154 of the main ground plane 150.

In order to electrically connect the sections 152 and 154 of the main ground plane together, an electromagnetic interference filter 162 is connected between the first section 152 of the main 12-volt power plane and each second section 154 of the main 12-volt power plane. These filters 162, like the filters 132, are dimensioned to block at least a portion of high frequency signals of the type generated by the switching power supplies 122 while enabling the sections 152 and 154 to be maintained at the same DC voltage level.

Figure 6A:
FIGS. 6A-6C are views illustrating exemplary electromagnetic filters.
Figure 6B:
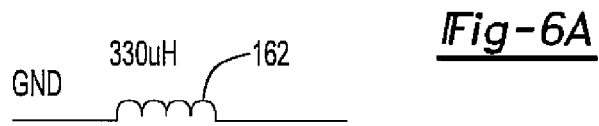
Figure 6B:
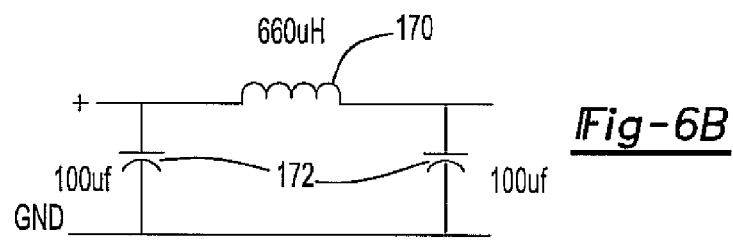
Figure 6C:
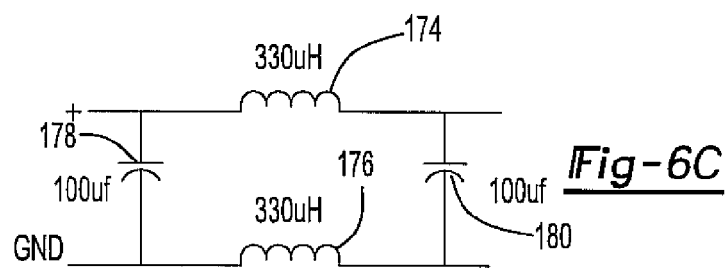

With reference now to FIGS. 6A-6C, exemplary EMI filters are there shown. For example, in FIG. 6A both the EMI filter 132 as well as the EMI filter 162 each comprises a single inductor. Such inductors attenuate or block a portion of the high frequency EMI from the switching power supply while permitting DC current to pass. Furthermore, a typical value of the inductors for the filters 132 and 162 would be 330 microhenries for a common power inverter for an HEV. It will be understood, however, that other values may be used for the inductors without deviation from the scope or spirit of the invention.

FIG. 6B provides a second example for the EMI Filters 132 and 162 in which they are combined as a single unit. In this example, an inductor 170 is electrically connected between the sections 116 and 118 of the main power plane while a capacitor 172 is electrically connected between each end of the inductor 170 and the respective ground planes 152 and 154. Typical values for the EMI filter illustrated in FIG. 6B would be 660 microhenries for the inductor 170 and 100 microfarads for the capacitors 172. In operation, the capacitors 172 bypass the high frequency EMI produced by the switching power supplies 122 directly from the power plane to the ground plane while the inductor 170 enables the power planes to be maintained at the same DC voltage level while blocking high frequency EMI noise.

With reference now to FIG. 6C, a still further example of an EMI filter is shown in which a first inductor 174 extends between the sections 116 and 118 of the power planes while, similarly, a second inductor 176 extends between the ground sections 152 and 154 of the main ground plane. A first capacitor 178 connects the first end of the inductors 174 and 176 together while a second capacitor 180 connects the other ends of the inductors 174 and 176 together.

Typical values for the inductors 174 and 176 would be 330 microhenries in an HEV system while the capacitors would have a value of 100 microfarads. In operation, the inductor 174 blocks high-frequency EMI noise from the sections 118 to section 114 of the power plane while permitting these sections to be maintained at the same voltage level. Similarly, the inductor 176 blocks the high-frequency EMI noise from the sections 154 to section 152 of the ground plane while enabling these sections to be maintained at the same voltage potential. The capacitors 178 and 180 provide a short circuit between the power plane and the ground plane for high frequency signals between the first and second sections respectively of the power and ground planes.

With reference now to FIG. 7, a current bus bar 200 for an HEV is shown and which, in operation, generates high magnetic fields. In order to attenuate these magnetic fields and EMI caused by them, the bar 200 is coated or covered by a ferrite material 202 which acts as a conductor for the magnetic field and shields the other components of the HEV from the magnetic field. Alternatively, or in addition, a ferrite coating 204 is applied to a housing 206 containing the bus bar 200 to contain the magnetic field.

From the foregoing, it can be seen that the present invention provides a simple and yet highly effective means for eliminating the adverse effects of EMI generated by a switching power supply, e.g. a power switching power supply, in the power inverter for an HEV. Having described our invention, however, many modifications thereto will become apparent to those skilled in the art to which it pertains without deviation from the spirit of the invention as defined by the scope of the appended claims.

We claim:

1. A power inverter comprising:
    a printed circuit board having at least one power layer with at least a first and a second section, said sections being electrically separated from each other on said power layer and maintained at different voltages in operation,
    a circuit component connected to and powered by said first section of the power layer,
    a PWM switching power supply mounted in and powered by said second section of the power layer,
    an electromagnetic filter electrically connected between said sections of said power layer, said filter configured to block at least a portion of high frequency signals between said sections while enabling said sections to be maintained at the same DC voltage level, wherein said printed circuit board comprises:
    a ground layer having a first section and a second section electrically separated from each other on said ground layer,
    a load circuit, functioning as control or signal conditioning, connected to said first section of the ground layer,
    a PWM switching power supply module connected to said second section of the ground layer,
    a second electromagnetic filter electrically connected between said sections of said ground layer, said filter configured to block a portion of high frequency noise from said sections of the ground layer while enabling said sections to be maintained at the same DC voltage level.

2. The invention as defined in claim 1 wherein said electromagnetic filter comprises an inductor.

3. The invention as defined in claim 1 wherein said electromagnetic filter comprises a capacitor.

4. The invention as defined in claim 1 wherein said power inverter is used to power a hybrid electric vehicle.

5. The invention as defined in claim 1 wherein said second electromagnetic filter comprises an inductor.

6. The invention as defined in claim 1 wherein said second electromagnetic filter comprises a capacitor.

7. The invention as defined in claim 1 wherein the power inverter contains a current bus bar and comprising a ferrite covering around said bus bar.

8. A method for attenuating electromagnetic interference on a printed circuit board of a power inverter between a switching power supply and a circuit component electrically connected to a power layer comprising the steps of:
    electrically separating the power layer into a first and second section maintained at different voltage levels in operation, said first section connected to the control circuit and said second section connected to the switching power supply,
    electrically connecting an electromagnetic filter between the sections of die power layer, said filter being configured to block high frequency signals of the type generated by the switching power supply while enabling the sections to be maintained at the same DC voltage level, wherein the printed circuit board includes a ground layer and further comprising the steps of:
    electrically separating the ground layer into a first and second section, said first section connected to the control circuit and said second section connected to the switching power supply,
    electrically connecting a second electromagnetic filter between the sections of the ground layer, said filter being configured to block high frequency signals of the type generated by the switching power supply while enabling the sections to be maintained at the same DC voltage level.

9. The invention as defined in claim 8 wherein said filter comprises an inductor.

10. The invention as defined in claim 8 wherein said filter comprises a capacitor.

11. The invention as defined in claim 8 wherein said second electromagnetic filter comprises an inductor.

12. The invention as defined in claim 8 wherein said second electromagnetic filter comprises a capacitor.

13. The invention as defined in claim 8 wherein the power inverter is employed in a hybrid electric vehicle.

* * * * *